US012774030B2

(12) United States Patent
(10) Patent No.: US 12,774,030 B2
(45) Date of Patent: Oct. 27, 2026

Ekman et al.

(54) AUTONOMOUS DUMP VEHICLE CONFIGURED TO SELECTIVELY STEER USING FRONT AND/OR REAR WHEELS

(71) Applicant: VOLVO CONSTRUCTION EQUIPMENT AB, Eskilstuna (SE)

(72) Inventors: Gordon Ekman, Moheda (SE); Kim Örkenrud, Växjö (SE); Roland Kvist, Braås (SE)

(73) Assignee: VOLVO CONSTRUCTION EQUIPMENT AB, Eskilstuna (SE)

(*) Notice: Subject to any disclaimer, the term of this patent is extended or adjusted under 35 U.S.C. 154(b) by 0 days.

(21) Appl. No.: 19/222,715

(22) Filed: May 29, 2025

(65) Prior Publication Data

US 2026/0008496 A1 Jan. 8, 2026

(30) Foreign Application Priority Data

Jul. 4, 2024 (EP) .................................... 24186411

(51) Int. Cl.
*B62D 7/15* (2006.01)

(52) U.S. Cl.
CPC .................................... *B62D 7/159* (2013.01)

(58) Field of Classification Search
CPC ........ B62D 7/159; B62D 9/007; B62D 17/00; B62D 7/142; B62D 6/02
See application file for complete search history.

(56) References Cited

U.S. PATENT DOCUMENTS

| | | | | |
|---|---|---|---|---|
| 10,488,172 | B1 | 11/2019 | Funke et al. | |
| 10,759,416 | B1 * | 9/2020 | Funke | B60T 8/17554 |
| 11,952,010 | B1 | 4/2024 | Roy | |
| 2021/0402984 | A1 * | 12/2021 | Funke | B60W 10/20 |

FOREIGN PATENT DOCUMENTS

| | | | |
|---|---|---|---|
| CN | 114523837 | A | 5/2022 |
| DE | 3533216 | A1 | 3/1987 |
| EP | 2698304 | A1 | 2/2014 |
| JP | S61175178 | A | 8/1986 |
| WO | 2008129275 | A1 | 10/2008 |
| WO | 2023151896 | A1 | 8/2023 |

OTHER PUBLICATIONS

Extended European Search Report, European Application No. 24186411.5, mailed Nov. 29, 2024, 6 pages.

* cited by examiner

*Primary Examiner* — Xiao En Mo
(74) *Attorney, Agent, or Firm* — Sage Patent Group

(57) ABSTRACT

An autonomous dump vehicle including a first set of steerable wheels, a second set of steerable wheels, and a load body. The autonomous dump vehicle is configured to steer using both the first set of steerable wheels and the second set of steerable wheels up to a speed threshold, and steer using either the first set of steerable wheels or the second set of steerable wheels above the speed threshold.

20 Claims, 6 Drawing Sheets

AUTONOMOUS DUMP VEHICLE CONFIGURED TO SELECTIVELY STEER USING FRONT AND/OR REAR WHEELS

CROSS-REFERENCE TO RELATED APPLICATION

This application claims priority to European Patent Application No. 24186411.5, filed on Jul. 4, 2024, the disclosure and content of which is incorporated by reference herein in its entirety.

TECHNICAL FIELD

The disclosure relates generally to transport vehicles. In particular aspects, the disclosure relates to an autonomous dump vehicle and to a method of operating an autonomous dump vehicle. The disclosure can be applied to heavy-duty transport vehicles, such as trucks, among other vehicle types. Although the disclosure may be described with respect to a particular vehicle, the disclosure is not restricted to any particular vehicle.

BACKGROUND

Transport vehicles such as dump vehicles are frequently used for loading and/or transporting of material loads at quarries, construction sites, in forestry and the like. A load body of a dump vehicle, or dumper, may for instance be loaded with unprocessed material, such as rock fragments, at a loading location. The dumper may transport the material to another location where it is unloaded or dumped for further processing.

For reasoning of cost-efficiency and safety, transport vehicles may be advantageously be autonomous. Even though there exist autonomous transport vehicles that function satisfactory, there is still room for improvements for instance in terms of their driving characteristics.

SUMMARY

According to a first aspect of the disclosure, there is provided an autonomous dump vehicle comprising a first set of steerable wheels, a second set of steerable wheels and a load body. The autonomous dump vehicle is configured to steer using both the first set of steerable wheels and the second set of steerable wheels up to a speed threshold, and steer using either the first set of steerable wheels or the second set of steerable wheels above the speed threshold. The first aspect of the disclosure may seek to safeguard high cost-efficiency and safety, by ensuring good driving characteristics both as regards maneuverability and stability. A technical benefit may include that good maneuverability is ensured at lower speeds, while good stability is ensured at higher speeds. Typically, maneuverability such as small turning radius is not an issue at higher speeds, while stability such as road holding is not an issue at lower speeds.

Thus, the first aspect may provide an autonomous dump vehicle configured to steer using both the first set of steerable wheels and the second set of steerable wheels up to a speed threshold for reasons of maneuverability, and steer using either the first set of steerable wheels or the second set of steerable wheels above the speed threshold for reasons of road holding. For example, the autonomous dump vehicle may be configured for four-wheel steering up to the speed threshold and two-wheel steering above the speed threshold.

In some embodiments, the autonomous dump vehicle, above the speed threshold, is configured to steer using the first set of steerable wheels, while arranging the second set of steerable wheels in a straight ahead position. Or, above the speed threshold, the autonomous dump vehicle is configured to steer using the second set of steerable wheels, while arranging the first set of steerable wheels in a straight ahead position.

In some embodiments, the autonomous dump vehicle is configured such that the speed threshold depends on a load carried by the load body. In other words, the speed threshold may depend on the weight of a load that is carried by the load body. A technical benefit may include yet further improved cost-efficiency and safety. Should the autonomous dump vehicle for example not carry any load, meaning that the load body is empty, then typically the autonomous dump vehicle may be allowed to steer using both the first set of steerable wheels and the second set of steerable wheels up to a higher speed threshold, as compared to if the load body is fully loaded. Allowing the autonomous dump vehicle to steer using both sets of steerable wheels improves the maneuverability and thus the cost-efficiency. Thus, allowing an unloaded autonomous dump vehicle to steer using both sets of steerable wheels up to a higher speed threshold improves the cost-efficiency. Similarly, setting a lower speed threshold for steering using both sets of steerable wheels when the autonomous dump vehicle is fully loaded improves the safety.

In some embodiments, the speed threshold is decreased when the load carried by the load body exceeds a load threshold. In other words, the speed threshold may be decreased when the weight of a load that is carried by the load body exceeds a threshold. Similarly, the speed threshold may be increased when the load carried by the load body subceeds a load threshold. Referring to the previous paragraph, a technical benefit may include yet further improved cost-efficiency and safety.

In some embodiments, the autonomous dump vehicle is configured such that the speed threshold depends on a road condition. For example, if the road conditions are poor (e.g., slippery), the speed threshold may be lowered or decreased and if the road conditions are good, the speed threshold may be raised or increased.

In some embodiments, the autonomous dump vehicle comprises at least one electric machine arranged to drive and brake one or more of the steerable wheels. A technical benefit may include yet further improved cost-efficiency, as the brake energy may be converted into electric energy that may be saved to propel the autonomous dump vehicle. Further, braking using an electric machine ma reduce wear on optional mechanical brakes. The autonomous dump vehicle may be an electric autonomous dump vehicle.

In some embodiments, the autonomous dump vehicle comprises a parking brake that is not dimensioned to decelerate the autonomous dump vehicle. Thus, the parking brake, which typically is a mechanical brake, for example a drum brake, is not dimensioned to reduce a speed of the autonomous dump vehicle. Instead, the parking brake in only dimensioned to keep or hold the autonomous dump vehicle stationary or at standstill. As is known to persons skilled in the art, a brake dimensioned to reduce a speed of a dump vehicle is of a much more extensive design than a brake that is dimensioned to hold a dump vehicle at standstill. The parking brake may be referred to as an emergency brake or a service brake. The parking brake may be the only mechanical brake of the autonomous dump vehicle. The autonomous dump vehicle may be configured to brake to decelerate only using an electric machine, as describe in the above paragraph.

In some embodiments, the first set of steerable wheels comprises first left and right steerable wheels and the second set of steerable wheels comprises second left and right steerable wheels, wherein the autonomous dump vehicle is configured to arrange the first left and right steerable wheels or the second left and right steerable wheels in a toe-in configuration when the speed of the autonomous dump vehicle exceeds a first toe-in speed threshold. A technical benefit may include ensured stability at higher speeds, i.e., at speeds above the first toe-in speed threshold. The first toe-in speed threshold may be the same as the speed threshold at which the autonomous dump vehicle steers steer using either the first set of steerable wheels or the second set of steerable wheels. Alternatively, the first toe-in speed threshold may be 110 to 500 percent, such as 150 to 300 percent, of the speed threshold at which the autonomous dump vehicle steers steer using either the first set of steerable wheels or the second set of steerable wheels. Thus, the first toe-in speed threshold may be higher than the speed threshold at which the autonomous dump vehicle steers steer using either the first set of steerable wheels or the second set of steerable wheels.

In some embodiments, the autonomous dump vehicle is configured to arrange the first left and right steerable wheels and the second left and right steerable wheels in a toe-in configuration when the speed of the autonomous dump vehicle exceeds a second toe-in speed threshold. Typically, the second toe-in speed threshold is higher than the first toe-in speed threshold. A technical benefit may include yet further ensured stability at higher speeds, i.e., at speeds above the second toe-in speed threshold.

In some embodiments, the autonomous dump vehicle is configured to arrange the first left and right steerable wheels in a toe-in configuration and the second left and right steerable wheels in a toe-out configuration to replace or supplement a parking brake of the autonomous dump vehicle. A technical benefit may include that the parking brake may be replaced or supplemented in a cost-effective and/or safe manner.

In some embodiments, the autonomous dump vehicle is configured to be braked only using an electric machine and a toe-in or toe-out configuration of the steerable wheels. Thus, the autonomous dump vehicle may be free from a dedicated brake, i.e., a brake that were provided only to decelerate and/or hold the autonomous dump vehicle at standstill. A technical benefit may include a cost-efficient design, both as regards production, repair and service.

In some embodiments, the autonomous dump vehicle comprises a toe actuator. A technical benefit may include that the toe-in configuration may be obtained in a cost-efficient manner.

In some embodiments, the autonomous dump vehicle comprises a steering rod arrangement, wherein the toe actuator is connected to a steering rod of the steering rod arrangement. A technical benefit may include a simple and reliable implementation of the toe actuator.

In some embodiments, the autonomous dump vehicle is configured to have the same driving characteristics in a first driving direction and in a second, opposite, driving direction. For example, the maximum speed of the autonomous dump vehicle may be the same in the first and second driving directions. A technical benefit may include ensured cost-efficiency, for example since effective operation in quarries or at construction sites may be facilitated as the autonomous dump vehicle needs not turn around when repeatedly driving back and forth between two locations. The autonomous dump vehicle may thus be configured for operation 50 percent in each direction. As an example, the maximum speed of the autonomous dump vehicle may be approximately 30 to 40 km/h. A typical nominal operating speed may be 15 to 20 km/h.

In some embodiments, the autonomous dump vehicle may comprise a vehicle chassis to which the load body and the first and second sets of steerable wheels are mounted, wherein the footprint of the load body is larger than the footprint of the vehicle chassis. A technical benefit of such a large load body may include ensured cost-efficiency. For example, the autonomous dump vehicle may be free from a driver cabin.

In some embodiments, the autonomous dump vehicle may have a load capacity of at least ten tons. The autonomous dump vehicle may be configured to carry a load of at least twice its weight. Thus, the autonomous dump vehicle may be dedicated to load transport.

In some embodiments, the autonomous dump vehicle comprises 4G, 5G and/or 6G antennas, equipment for positioning using real-time kinematic positioning (RTK) and global navigation satellite system (GNSS), and light detection and ranging (Lidar) equipment. A technical benefit may include ensured autonomous operability.

According to a second aspect of the disclosure, there is provided a method of operating an autonomous dump vehicle that comprises a first set of steerable wheels, a second set of steerable wheels and a load body The method comprises detecting a speed of the autonomous dump vehicle, steering using both the first set of steerable wheels and the second set of steerable wheels up to a speed threshold, and steering using either the first set of steerable wheels or the second set of steerable wheels above the speed threshold. The method may be computer-implemented.

The concepts of the present disclosure may be applied to other heavy-duty transport vehicles than autonomous dump vehicles. Thus, according to a general aspect of the disclosure, there is provided a heavy-duty transport vehicle comprising a first set of steerable wheels, a second set of steerable wheels and a load body. The heavy-duty transport vehicle is configured to steer using both the first set of steerable wheels and the second set of steerable wheels up to a speed threshold, and steer using either the first set of steerable wheels or the second set of steerable wheels above the speed threshold.

As regards problems solved, and further possible features and associated advantages, of the second and the general aspect, reference is made to the herein provided description of the first aspect.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The inventive concept of this disclosure generally aims at improving the cost-efficiency and safety of heavy-duty transport vehicles, by steering using first and second sets of steerable wheels up to a speed threshold, and steering using only one set above the speed threshold.

Figure 1:
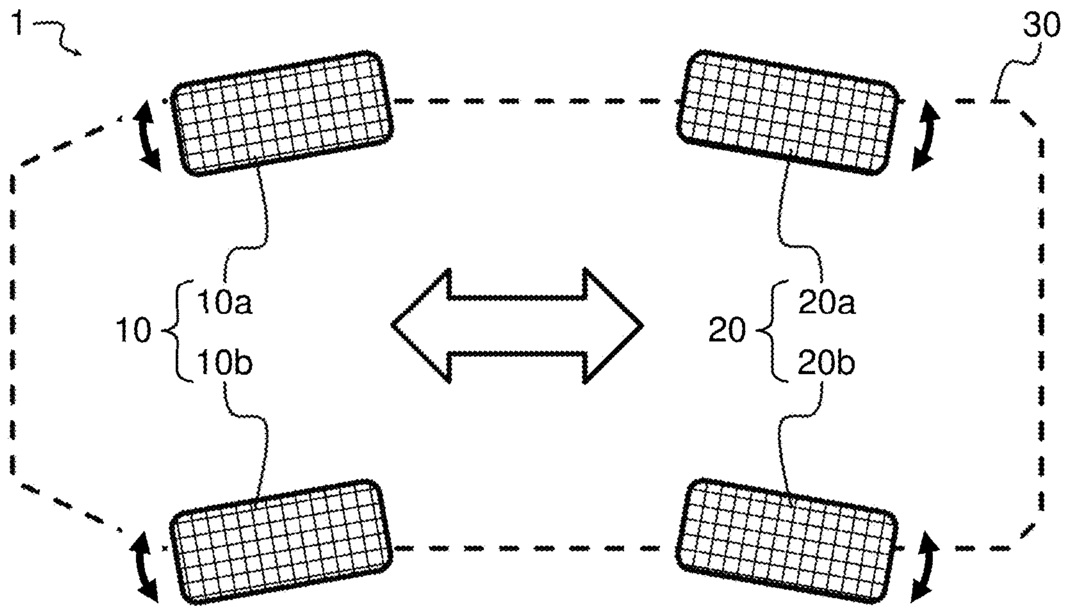
FIG. 1 is an exemplary plan view of an autonomous dump vehicle according to an example.
Figure 2:
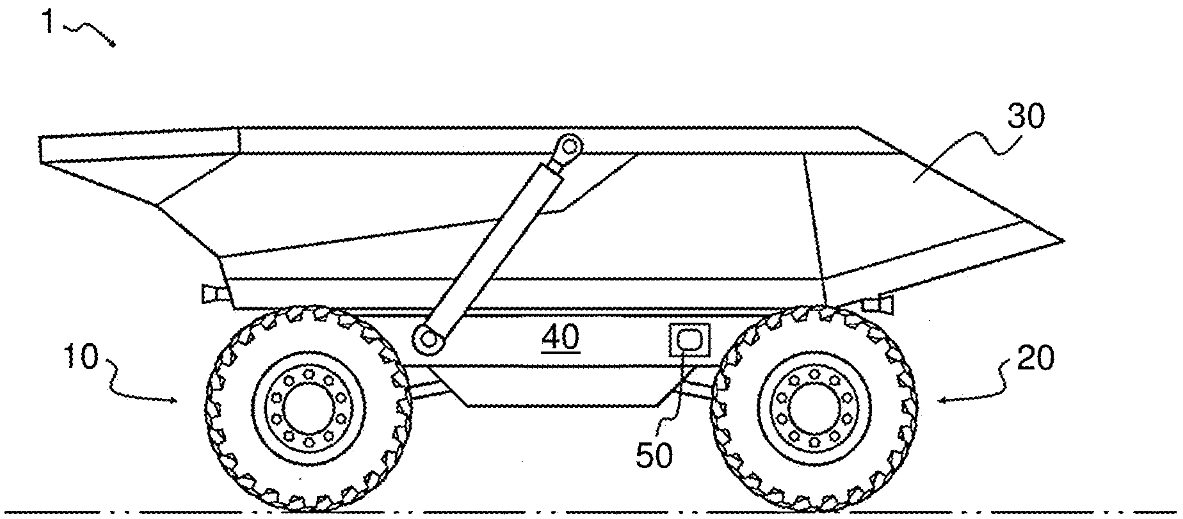
FIG. 2 is a side view of the autonomous dump vehicle of FIG. 1.

FIG. 1 and FIG. 2 illustrates a heavy-duty transport vehicle in the form of an autonomous dump vehicle 1. The autonomous dump vehicle 1 may be referred to as an autonomous dumper. The autonomous dump vehicle 1 (hereinafter also referred to as vehicle) comprise a first set of steerable wheels 10, a second set of steerable wheels 20 and a load body 30.

In the present examples, the autonomous dump vehicle 1 is configured to have the same driving characteristics in a first driving direction and in a second, opposite, driving direction. Thus, the maximum speed of the autonomous dump vehicle 1 is the same in the first and second driving directions. Typically, the autonomous dump vehicle 1 will operate 50 percent in each direction.

The illustrated, see in particular FIG. 2, autonomous dump vehicle 1 compromises a vehicle chassis 40 to which the load body 30 and the first and second sets of steerable wheels 10, 20. As is clear from FIG. 1, the footprint of the load body 30 is larger than the footprint of the vehicle chassis 40. In a view from above, the load body 30 covers the vehicle chassis 40. Typically, the autonomous dump vehicle 1 has a load capacity of at least ten tons. Moreover, the autonomous dump vehicle is typically configured to carry a load of at least twice its weight.

In order to provide for autonomous, and/or remote, operation, the vehicle 1 may comprise undepicted 4G, 5G and/or 6G antennas. Further, there may be undepicted equipment for positioning using real-time kinematic positioning (RTK) and global navigation satellite system (GNSS), and also light detection and ranging (Lidar) equipment. For the same reason, the vehicle 1 may comprise cameras (schematically illustrated to the left and right in FIG. 2).

In the present examples, the load body 30 is articulatable, as in evident from FIG. 2 that discloses a hydraulic or electric actuator that is connected to the load body 30 and to the vehicle chassis 40. Thus, the load body 30 is pivotable or tippable, between a transport position (FIG. 2) and a tipping position (not shown). Typically, in the transport position the load body 30 is oriented to be filled with load and retain the load. In the transport position the load body 30 may be oriented substantially horizontally, and may be said to be in a transport posture. Typically, in the tipping position the load body 30 is oriented to discharge or pour the load from the load body. In the tipping position the load body 30 may be oriented at a tipping angle to the horizontal, and may be said to be in a tipping or dumping posture.

As is illustrated in FIG. 1, the autonomous dump vehicle 1 comprises a first set of steerable wheels 10 and a second set of steerable wheels 20. The first set of steerable wheels 10 may be referred to as front wheels and a second set of steerable wheels 20 may be referred to as rear wheels. However, since the vehicle 1 is configured to have the same driving characteristics in the first and second driving directions, the vehicle 1 does not really have a front and a rear end. Thus, the first set of steerable wheels 10 may be referred to as rear wheels and a second set of steerable wheels 20 may be referred to as front wheels. In any case, the first set of steerable wheels 10 are arranged as a first end of the vehicle 1 whereas the second set of steerable wheels 20 are arranged at a second, opposite, end of the vehicle 1.

The autonomous dump vehicle 1 is configured to steer using both the first set of steerable wheels 10 and the second set of steerable wheels 20 up to a speed threshold $v_t$, and to steer using either the first set of steerable wheels 10 or the second set of steerable wheels 20 above the speed threshold $v_t$.

Figure 3:
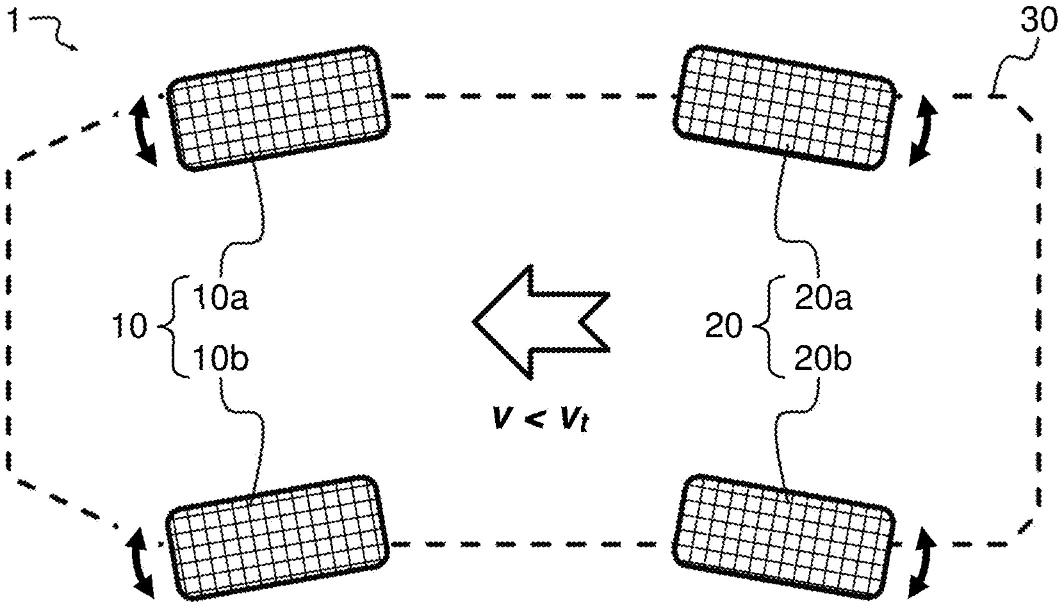
FIG. 3 to FIG. 9 show the autonomous dump vehicle of FIG. 1 with steerable wheels controlled according to examples of the present disclosure.
Figure 4:
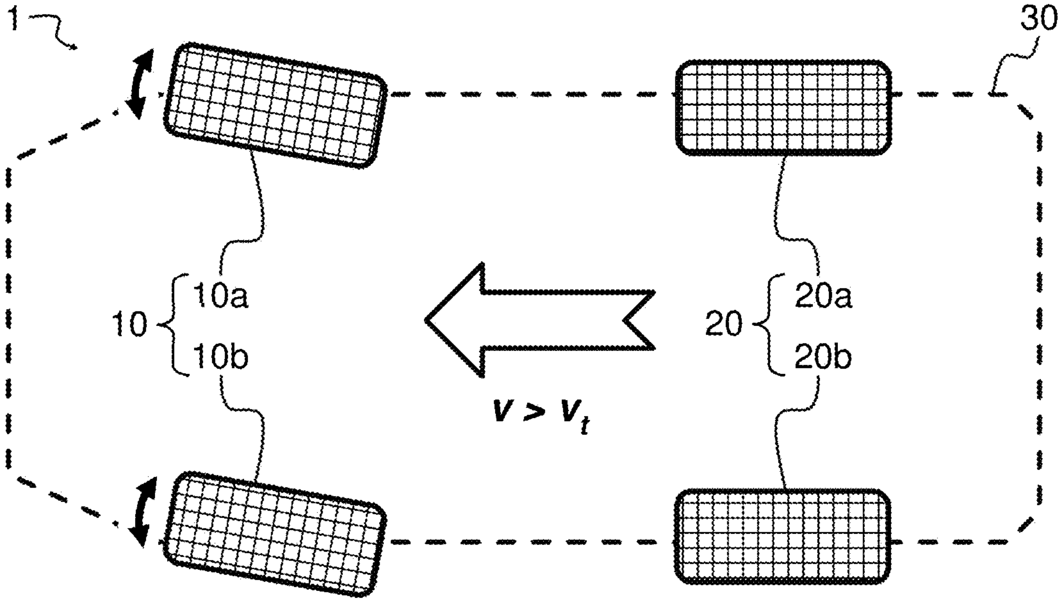

FIG. 3 to FIG. 9 illustrate operations of the vehicle 1 according to examples. Referring initially to FIG. 3, when the vehicle 1 operates, in this case moves or drives, relatively slow, i.e., below the speed threshold $v_t$ (vehicle speed $v<v_t$), the vehicle may steer using both the first set of steerable wheels 10 and the second set of steerable wheels 20. The double-ended curved arrows next to all wheels 10, 20 of FIG. 3 illustrate that all wheels are steered. In FIG. 3, the vehicle 1 drives in a first direction, to the left in the figure. Turning now to FIG. 4, when the vehicle 1 drives faster in the first direction, i.e., above the speed threshold $v_t$ ($v>v_t$), the vehicle 1 may steer using only the first set of steerable wheels 10. In the example of FIG. 4, the first set of steerable wheels 10 are the present front wheels. The double-ended curved arrows next to the first set of steerable wheels 10 in FIG. 4 illustrate that the first set of steerable wheels 10 steered, while the second set of steerable wheels 20 are not.

Thus, as exemplified in FIG. 3 and FIG. 4, the autonomous dump vehicle 1 may be configured for four-wheel steering (FIG. 3) below a certain speed and two-wheel steering (FIG. 4) above the speed. The transition between four-wheel steering and two-wheel steering may be abrupt or gradual. Referring to FIG. 4, the autonomous dump vehicle 1, above the speed threshold $v_t$, may be configured to steer using the first set of steerable wheels 10, while arranging the second set of steerable wheels 20 in a straight ahead position.

Figure 5:
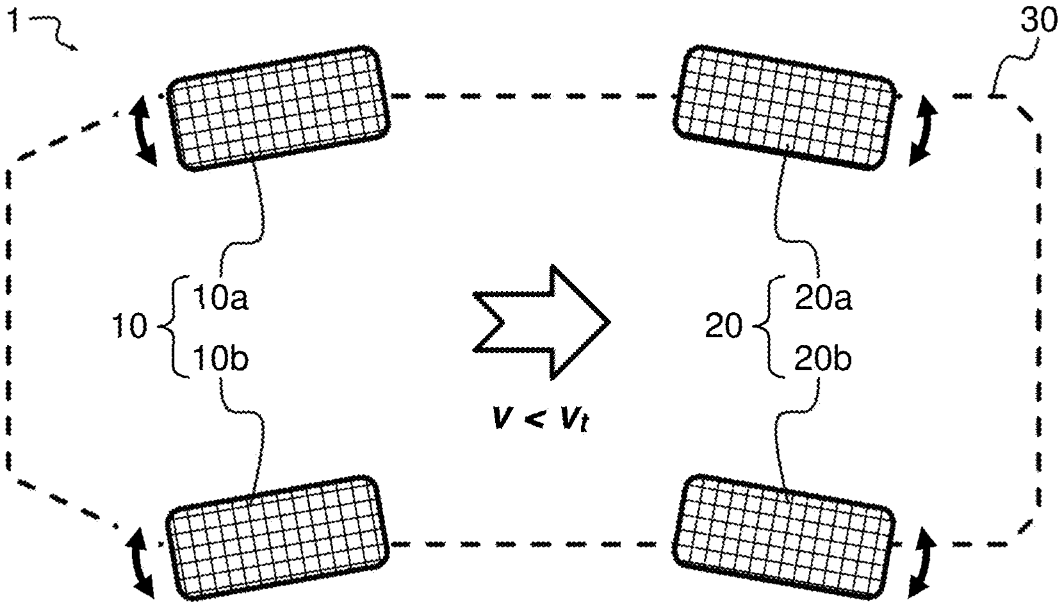
Figure 6:
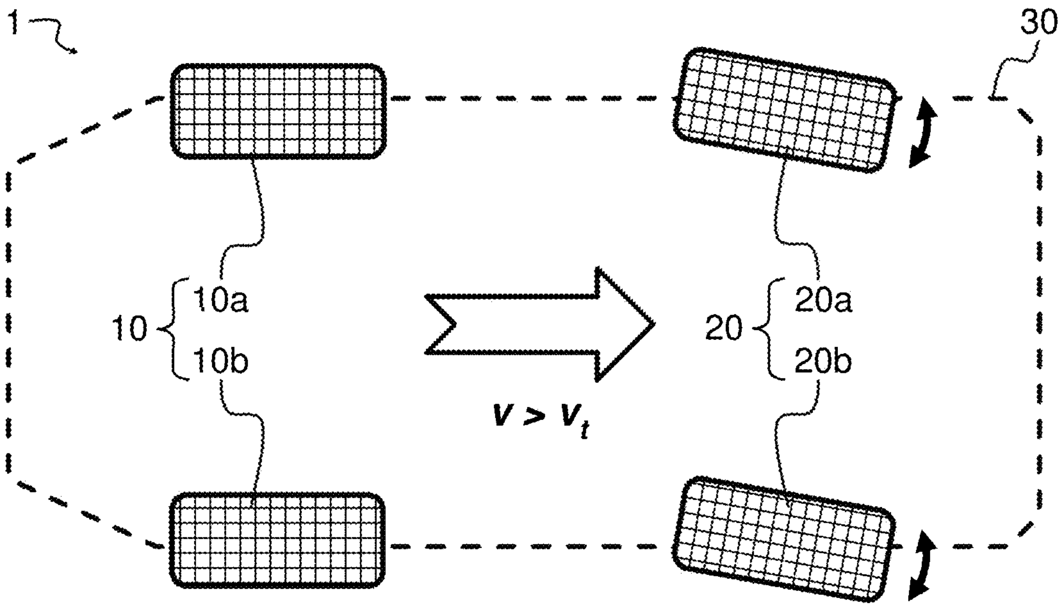

FIG. 5 and FIG. 6 show the vehicle 1 when driving in a second direction, to the right in the figures. In FIG. 5, the vehicle 1 drives relatively slow, i.e., below the speed threshold $v_t$, and the vehicle 1 is steered using both the first set of steerable wheels 10 and the second set of steerable wheels 20, as indicated by the double-ended curved arrows. In FIG. 6, vehicle 1 drives faster in the second direction ($v>v_t$) and the vehicle 1 is steered using only the second set of steerable wheels 20. In the example of FIG. 6, the second set of steerable wheels 20 are the present front wheels. The double-ended curved arrows next to the second set of steerable wheels 20 in FIG. 6 illustrate that they are steered, while the first set of steerable wheels 10 are not.

Referring to FIG. 6, the autonomous dump vehicle 1, above the speed threshold $v_t$, may be configured to steer using the second set of steerable wheels 20, while arranging the first set of steerable wheels 10 in a straight ahead position.

Figure 7:
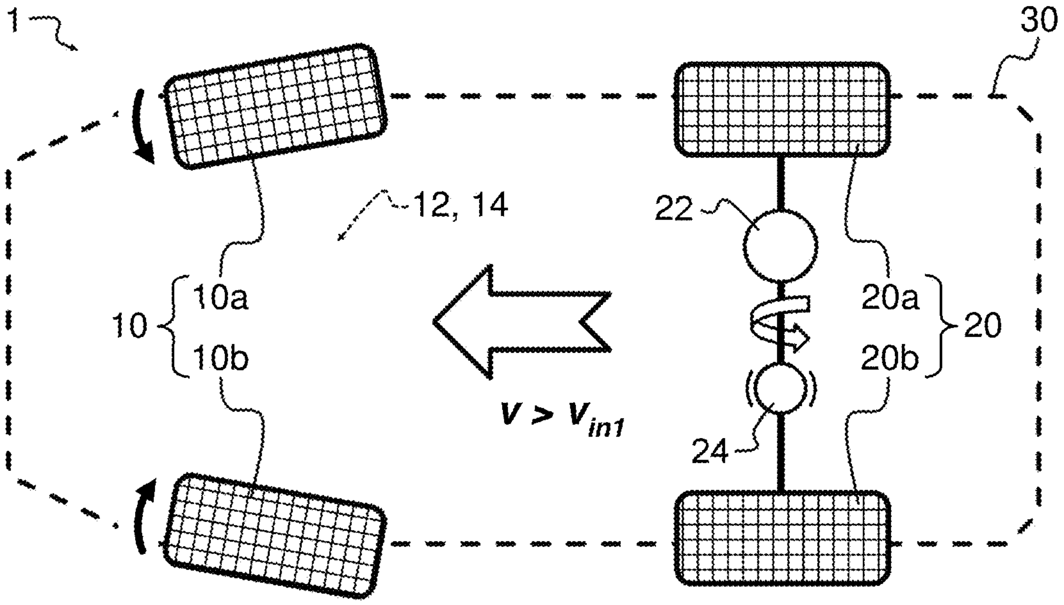

Referring to FIG. 7, there is illustrated an electric machine 22 arranged to drive and brake the second steerable wheels 20. The vehicle may also comprise an electric machine 12 arranged to drive and brake the first steerable wheels 10. In the illustrated example, the single electric machine 22 is arranged to drive and brake a second wheel axle that carries the second steerable wheels 20. In other examples, there may be two or more electric machines associated with the second wheel axle. Alternatively, each or one of the second steerable wheels may be driven and braked by an electric machine assigned to that particular second steerable wheel. Corresponding arrangements may be provided for driving and braking a first wheel axle that carries the first steerable wheels 10. In one example, there is a single electric machine provided for driving and braking both the first and the second wheel axle.

As is also shown in FIG. 7, the autonomous dump vehicle 1 may comprise a parking brake 24, herein schematically illustrated as a mechanical brake in the form of a drum brake. Typically, the parking brake 24 is not dimensioned to decelerate the autonomous dump vehicle 1.

Figure 8:
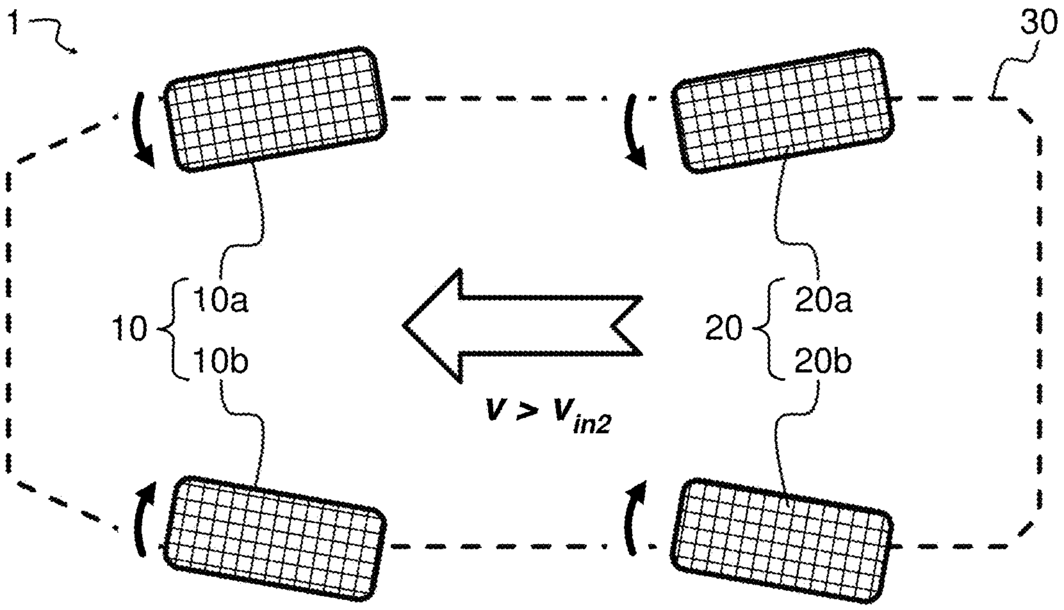
Figure 9:
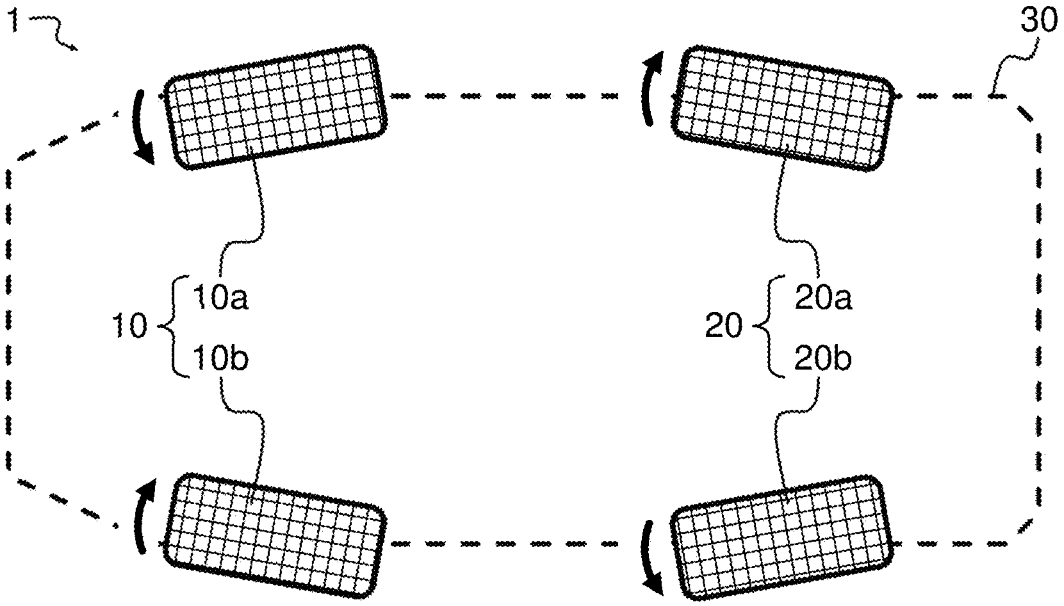

Referring to each one of FIG. 1 and FIG. 3 to FIG. 10, the first set of steerable wheels 10 may comprise first left and right steerable wheels 10*a*, 10*b* and the second set of steerable wheels 20 may comprise second left and right steerable wheels 20*a*, 20*b*. Now, as is shown in FIG. 7, the vehicle 1 may be configured to arrange the first left and right steerable wheels 10*a*, 10*b* in a toe-in configuration or toe-in setting. Referring to FIG. 8, the vehicle 1 may be configured to arrange the first left and right steerable wheels 10*a*, 10*b* and also the second left and right steerable wheels 20*a*, 20*b* in a toe-in configuration. FIG. 9 shows that the vehicle 1 may be configured to arrange the first left and right steerable wheels 10*a*, 10*b* in a toe-in configuration and second left and right steerable wheels 20*a*, 20*b* in a toe-out configuration.

A toe-in configuration may be beneficial for such as road holding. A toe-in configuration or a toe-out may be used for braking (decelerating) the vehicle 1, and also for holding the vehicle 1 at standstill.

FIG. 7 shows an autonomous dump vehicle 1 driven at a speed that exceeds a first toe-in speed threshold $v_{in1}$ and with the first left and right steerable wheels 10*a*, 10*b* arranged in a toe-in configuration. Alternatively, the second left and right steerable wheels 20*a*, 20*b* could be arranged in a toe-in configuration. FIG. 8 shows the vehicle 1 driven faster, at a speed that exceeds a second toe-in speed threshold $v_{in2}$, and with the first left and right steerable wheels 10*a*, 10*b* and the second left and right steerable wheels 20*a*, 20*b* arranged in a toe-in configuration.

As is shown in FIG. 9 the autonomous dump vehicle 1 may be configured to arrange the first left and right steerable wheels 10*a*, 10*b* in a toe-in configuration and the second left and right steerable wheels 20*a*, 20*b* in a toe-out configuration. In such a manner, a parking brake may be supplemented, which means that the force required to keep the vehicle at standstill comes from both the parking brake and from the toe configuration of the steerable wheels. In some applications, a parking brake may be even be replaced (dispensed with), meaning that the force required to keep the vehicle at standstill comes from the toe configuration of the steerable wheels alone.

Figure 10:
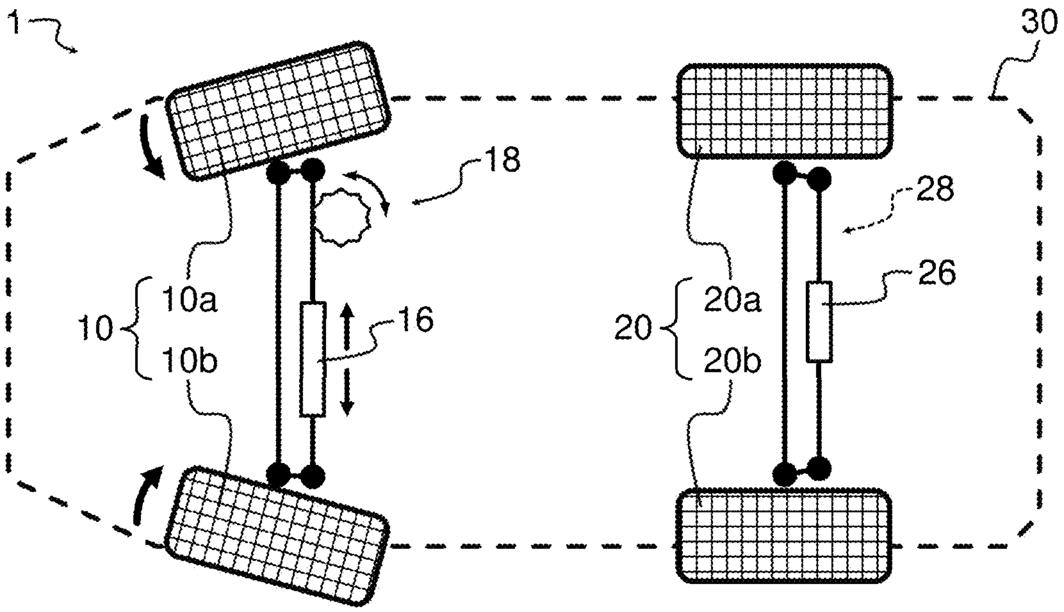
FIG. 10 illustrates a toe actuator of the autonomous dump vehicle of FIG. 1 according to examples.

FIG. 10 illustrates an autonomous dump vehicle 1 that comprises a toe actuator 16 associated with the first set of steerable wheels 10. In the shown example, the vehicle 1 comprises a steering rod arrangement 18 and the toe actuator 16 is connected to a steering rod of the steering rod arrangement 18. The steering rod arrangements per se are known to persons skilled in the art, and not described in detail herein. The toe actuator 16 may be arranged to change the length (see arrows next to toe actuator 16 in FIG. 10) of a steering rod, to thereby modify the toe setting of the first set of steerable wheels 10. FIG. 10 further schematically illustrates rotatable gear (see double-ended arrow) that may drive the steering rod to steer the first set of steerable wheels 10. The vehicle may comprise a similar (second) toc actuator 26 associated with the second set of steerable wheels 20.

The autonomous dump vehicle may be configured such that the speed threshold $v_t$ depends on a load carried by the load body 30. In particular, the speed threshold $v_t$ may be decreased when the load carried by the load body 30 exceeds a load threshold. Furthermore, or alternatively, the speed threshold $v_t$ may depend on a road condition.

Similarly, the first toe-in speed threshold Vin and the second toe-in speed threshold $v_{in2}$, may depend on a load carried by the load body 30 and/or on a road condition.

In some examples, the speed threshold $v_t$ may be in the range of 5 to 10 km/h. If the load body 30 is fully loaded, the speed threshold vi may be decreased by for example 20-50 percent. If the road condition is challenging, e.g., comprise loose material, the speed threshold $v_t$ may be decreased by for example 20-50 percent. Accordingly, is some examples, if the load body 30 is fully loaded and the road condition is challenging, the speed threshold $v_t$ may be decreased by for example 36-75 percent.

In some examples, the first toe-in speed threshold $v_{in1}$ may be in the range of 10 to 14 km/h. The second toe-in speed threshold $v_{in2}$ may be in the range of 15 to 20 km/h. The first and second toe-in speed thresholds $v_{in1}$, $v_{in2}$ may be decreased in a similar manner as the speed threshold $v_t$.

Figure 11:
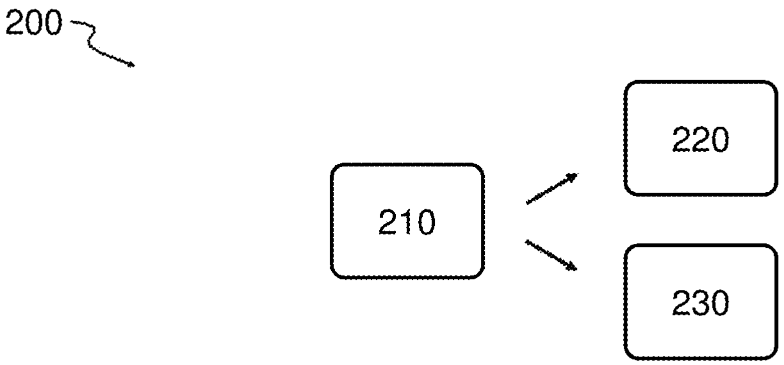
FIG. 11 is a flow chart of an exemplary method of operating an autonomous dump vehicle.

Referring to FIG. 11, a method 200 of operating an autonomous dump vehicle 1 that comprises a first set of steerable wheels 10, a second set of steerable wheels 20, and a load body 30, comprises detecting 210 a speed v of the autonomous dump vehicle 1, steering 220 using both the first set of steerable wheels 10 and the second set of steerable wheels 20 up to a speed threshold $v_t$ (see e.g. FIG. 3), and steering 230 using either the first set of steerable wheels 10 or the second set of steerable wheels 20 above the speed threshold $v_t$ (see e.g. FIG. 4).

The method 200 is for example applicable to the exemplified autonomous dump vehicles 1 described herein. Thus, the method 200 may in addition comprise braking or improving road holding using a toe-in configuration, and applying a toe-configuration to obtain a parking brake function, using at least one of the sets of steerable wheels 10, 20.

Figure 12:
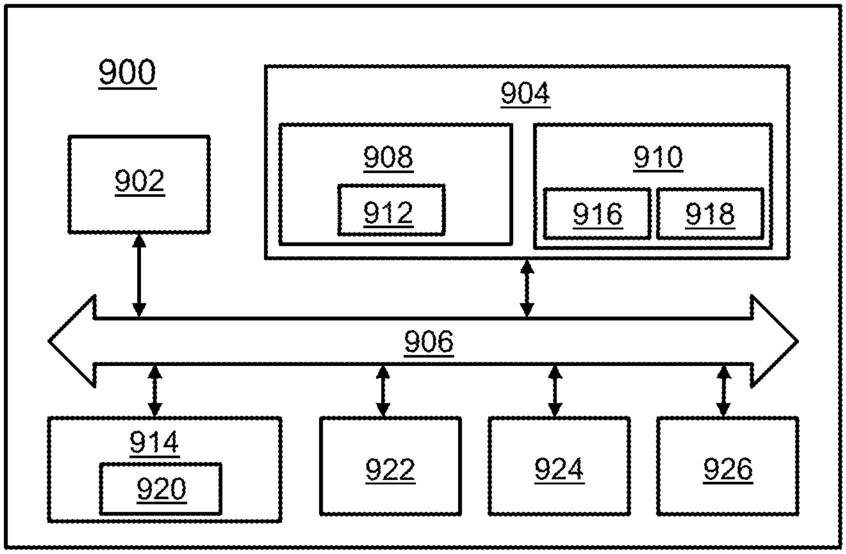
FIG. 12 is a schematic diagram of an exemplary computer system for implementing examples disclosed herein, according to an example.

The method 200 may be computer-implemented. FIG. 12 illustrates a computer system 900 adapted to execute instructions from a computer-readable medium to perform these and/or any of the functions or processing described herein. The computer system 900 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may be incorporated in a vehicle controller 50 indicated in FIG. 2 and may comprise at least one computing device or electronic device capable of including firmware, hardware, and/or executing software instructions to implement the functionality described herein. The computer system 900 may include processing circuitry 902 (e.g., processing circuitry including one or more processor devices or control units), a memory 904, and a system bus 906. The computer system 900 may include at least one computing device having the processing circuitry 902. The system bus 906 provides an interface for system components including, but not limited to, the memory 904 and the processing circuitry 902. The processing circuitry 902 may include any number of hardware components for conducting data or signal processing or for executing computer code stored in memory 904. The processing circuitry 902 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 902 may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code, which is hard or soft coded, may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software.

Although a specific order of method actions may be shown or described, the order of the actions may differ. In addition, two or more actions may be performed concurrently or with partial concurrence.

Examples according to the following clauses are also disclosed:

1. An autonomous dump vehicle (1) comprising
   a first set of steerable wheels (10),
   a second set of steerable wheels (20), and
   a load body (30),
   wherein the autonomous dump vehicle (1) is configured to
      steer using both the first set of steerable wheels (10) and the second set of steerable wheels (20) up to a speed threshold ($v_t$), and
      steer using either the first set of steerable wheels (10) or the second set of steerable wheels (20) above the speed threshold ($v_t$).
2. The autonomous dump vehicle (1) of clause 1, wherein when the autonomous dump vehicle (1), above the speed threshold ($v_t$), is configured to steer using the first set of steerable wheels (10), while arranging the second set of steerable wheels (20) in a straight ahead position, and vice versa.
3. The autonomous dump vehicle (1) of clause 1 or 2, configured such that the speed threshold ($v_t$) depends on a load carried by the load body (30).
4. The autonomous dump vehicle (1) of clause 3, wherein the speed threshold ($v_t$) is decreased when the load carried by the load body (30) exceeds a load threshold.
5. The autonomous dump vehicle (1) of any preceding clause, configured such that the speed threshold ($v_t$) depends on a road condition.
6. The autonomous dump vehicle (1) of any preceding clause, comprising at least one electric machine (12, 22) arranged to drive and brake one or more of the steerable wheels (10, 20).
7. The autonomous dump vehicle (1) of and preceding clause, comprising a parking brake (24) that is not dimensioned to decelerate the autonomous dump vehicle (1).
8. The autonomous dump vehicle (1) of any preceding clause, wherein the first set of steerable wheels (10) comprises first left and right steerable wheels (10*a*, 10*b*) and the second set of steerable wheels (20) comprises second left and right steerable wheels (20*a*, 20*b*), wherein the autonomous dump vehicle (1) is configured to arrange the first left and right steerable wheels (10*a*, 10*b*) or the second left and right steerable wheels (20*a*, 20*b*) in a toe-in configuration when the speed of the autonomous dump vehicle (1) exceeds a first toe-in speed threshold ($v_{in1}$).
9. The autonomous dump vehicle (1) of clause 8, wherein the autonomous dump vehicle (1) is configured to arrange the first left and right steerable wheels (10*a*, 10*b*) and the second left and right steerable wheels (20*a*, 20*b*) in a toe-in configuration when the speed of the autonomous dump vehicle (1) exceeds a second toe-in speed threshold ($v_{in2}$).
10. The autonomous dump vehicle (1) of any preceding clause, wherein the autonomous dump vehicle (1) is configured to arrange the first left and right steerable wheels (10*a*, 10*b*) in a toe-in configuration and the second left and right steerable wheels (20*a*, 20*b*) in a toe-out configuration to replace or supplement a parking brake (24) of the autonomous dump vehicle (1).
11. The autonomous dump vehicle (1) according to any of clauses 8 to 10, comprising a toe actuator (16, 26).
12. The autonomous dump vehicle (1) of clause 11, comprising a steering rod arrangement (18, 28), wherein the toe actuator (16, 26) is connected to a steering rod of the steering rod arrangement (18, 28).
13. The autonomous dump vehicle (1) of any preceding clause, configured to have the same driving characteristics in a first driving direction and in a second, opposite, driving direction, the maximum speed of the autonomous dump vehicle (1) being the same in the first and second driving directions, the maximum speed optionally being below 50 km/h.
14. The autonomous dump vehicle (1) of any preceding clause, comprising a vehicle chassis (40) to which the load body (30) and the first and second sets of steerable wheels (10, 20) are mounted, wherein the footprint of the load body (30) is larger than the footprint of the vehicle chassis (40).
15. The autonomous dump vehicle (1) of any preceding clause, having a load capacity of at least ten tons.
16. The autonomous dump vehicle (1) of any preceding clause, configured to carry a load of at least twice the weight of the autonomous dump vehicle (1).
17. The autonomous dump vehicle (1) of any preceding, comprising
   4G, 5G and/or 6G antennas,
   equipment for positioning using real-time kinematic positioning (RTK) and global navigation satellite system (GNSS), and
   light detection and ranging (Lidar) equipment.
18. The autonomous dump vehicle (1) of any preceding clause, comprising at least one electric machine (12, 22) arranged to drive and brake one or more of the steerable wheels (10, 20), and configured to arrange the first and/or second set of steerable wheels (10, 20) in a toe-in configuration, wherein the autonomous dump vehicle (1) is be free from a dedicated brake.
19. A method (200) of operating an autonomous dump vehicle (1) that comprises a first set of steerable wheels (10), a second set of steerable wheels (20), and a load body (30),
   wherein the method (200) comprises
      detecting (210) a speed of the autonomous dump vehicle (1),
      steering (220) using both the first set of steerable wheels (10) and the second set of steerable wheels (20) up to a speed threshold ($v_t$), and
      steering (230) using either the first set of steerable wheels (10) or the second set of steerable wheels (20) above the speed threshold ($v_t$).
20. The method (200) of clause 19, wherein the method is computer-implemented.
21. A computer program product comprising program code for performing, when executed by a processor device of a controller (50), the computer-implemented method (200) of operating an autonomous dump vehicle of clause 20.
22. A non-transitory computer-readable storage medium comprising instructions, which when executed by a processor device of a controller (50), cause the processing circuitry to perform the computer-implemented method (200) of operating an autonomous dump vehicle of clause 20.

The terminology used herein is for the purpose of describing particular aspects only and is not intended to be limiting of the disclosure. As used herein, the singular forms "a,"

"an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. An autonomous dump vehicle comprising:

a first set of steerable wheels, a second set of steerable wheels, and a load body, wherein the autonomous dump vehicle is configured to:

steer using both the first set of steerable wheels and the second set of steerable wheels up to a speed threshold, and steer using either the first set of steerable wheels or the second set of steerable wheels above the speed threshold.

2. The autonomous dump vehicle of claim 1, wherein when the autonomous dump vehicle, above the speed threshold, is configured to steer using the first set of steerable wheels, while arranging the second set of steerable wheels in a straight ahead position, and vice versa.

3. The autonomous dump vehicle of claim 1, configured such that the speed threshold depends on a load carried by the load body, wherein the speed threshold is decreased when the load carried by the load body exceeds a load threshold.

4. The autonomous dump vehicle of claim 1, comprising at least one electric machine arranged to drive and brake one or more of the steerable wheels.

5. The autonomous dump vehicle of claim 1, comprising a parking brake that is not dimensioned to decelerate the autonomous dump vehicle.

6. The autonomous dump vehicle of claim 1, wherein the first set of steerable wheels comprises first left and right steerable wheels and the second set of steerable wheels comprises second left and right steerable wheels, wherein the autonomous dump vehicle is configured to:

arrange the first left and right steerable wheels or the second left and right steerable wheels in a toe-in configuration when the speed of the autonomous dump vehicle exceeds a first toe-in speed threshold.

7. The autonomous dump vehicle of claim 6, wherein the autonomous dump vehicle is configured to:

arrange the first left and right steerable wheels and the second left and right steerable wheels in a toe-in configuration when the speed of the autonomous dump vehicle exceeds a second toe-in speed threshold.

8. The autonomous dump vehicle of claim 6, wherein the autonomous dump vehicle is configured to:

arrange the first left and right steerable wheels in a toe-in configuration and the second left and right steerable wheels in a toe-out configuration to replace or supplement a parking brake of the autonomous dump vehicle.

9. The autonomous dump vehicle of claim 6, comprising a toe actuator.

10. The autonomous dump vehicle of claim 1, comprising a vehicle chassis to which the load body and the first and second sets of steerable wheels are mounted, wherein the footprint of the load body is larger than the footprint of the vehicle chassis.

11. The autonomous dump vehicle of claim 1, comprising at least one electric machine arranged to drive and brake one or more of the steerable wheels, and configured to arrange the first and/or second set of steerable wheels in a toe-in configuration, wherein the autonomous dump vehicle is free from a dedicated brake.

12. The autonomous dump vehicle of claim 1, configured such that the speed threshold depends on a road condition.

13. The autonomous dump vehicle of claim 1, configured to have the same driving characteristics in a first driving direction and in a second, opposite, driving direction, the maximum speed of the autonomous dump vehicle being the same in the first and second driving directions.

14. The autonomous dump vehicle of claim 1, having a load capacity of at least ten tons.

15. The autonomous dump vehicle of claim 1, configured to carry a load of at least twice the weight of the autonomous dump vehicle.

16. The autonomous dump vehicle of claim 1, comprising:

4G, 5G and/or 6G antennas, equipment for positioning using real-time kinematic positioning and global navigation satellite system, and light detection and ranging equipment.

17. A method of operating an autonomous dump vehicle that comprises a first set of steerable wheels, a second set of steerable wheels, and a load body, the method comprising:

detecting a speed of the autonomous dump vehicle, steering using both the first set of steerable wheels and the second set of steerable wheels up to a speed threshold, and steering using either the first set of steerable wheels or the second set of steerable wheels above the speed threshold.

18. The method of claim 17, wherein the method is computer-implemented.

19. A computer program product comprising program code for performing, when executed by a processor device of a controller, the computer-implemented method of operating an autonomous dump vehicle of claim 18.

20. A non-transitory computer-readable storage medium comprising instructions, which when executed by processing circuitry of a controller, cause the processing circuitry to perform the computer-implemented method of operating an autonomous dump vehicle of claim 18.

* * * * *